United States Patent
Barnes et al.

(10) Patent No.: US 7,194,562 B2
(45) Date of Patent: Mar. 20, 2007

(54) METHOD, SYSTEM, AND PROGRAM FOR THROTTLING DATA TRANSFER

(75) Inventors: Jeffery Michael Barnes, Tucson, AZ (US); Brian Jeffrey Corcoran, Oro Valley, AZ (US); James Chien-Chiung Chen, Tucson, AZ (US); Minh-Ngoc Le Huynh, San Jose, CA (US); Frederick James Carberry, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 10/719,129

(22) Filed: Nov. 20, 2003

(65) Prior Publication Data

US 2005/0114562 A1   May 26, 2005

(51) Int. Cl.
  *G06F 3/00* (2006.01)
  *G06F 12/00* (2006.01)
  *G06F 3/01* (2006.01)

(52) U.S. Cl. .................. 710/36; 710/17; 710/29; 710/59; 711/147; 711/151

(58) Field of Classification Search ............ 710/29, 710/33; 711/147
See application file for complete search history.

(56) References Cited

U.S. PATENT DOCUMENTS

| | | | |
|---|---|---|---|
| 2002/0053011 A1* | 5/2002 | Aiken et al. | 711/170 |
| 2003/0115118 A1* | 6/2003 | Reinemann | 705/30 |
| 2003/0210651 A1* | 11/2003 | Tzeng et al. | 370/231 |
| 2004/0003069 A1* | 1/2004 | Wong | 709/223 |

* cited by examiner

Primary Examiner—Kim Huynh
Assistant Examiner—Scott Sun
(74) Attorney, Agent, or Firm—Tanaki K. Davda; Konrad Raynes & Victor LLP

(57) ABSTRACT

Disclosed is a technique for throttling data transfer. An amount of resources that are in use is determined. When the amount of resources reaches a high threshold, one or more primary control units are notified to temporarily stop sending data. When the amount of resources reaches a low threshold, each previously notified primary control unit is notified to resume sending data.

18 Claims, 8 Drawing Sheets

METHOD, SYSTEM, AND PROGRAM FOR THROTTLING DATA TRANSFER

BACKGROUND OF THE INVENTION

1. Field of the Invention

The present invention is directed to throttling data transfer between two or more systems.

2. Description of the Related Art

Disaster recovery systems typically address two types of failures, a sudden catastrophic failure at a single point in time or data loss over a period of time. In the second type of gradual disaster, updates to volumes on data storage may be lost. To assist in recovery of data updates, a copy of data may be provided at a remote location. Such dual or shadow copies are typically made as the application system is writing new data to a primary storage device at a primary storage subsystem. The copies are stored in a secondary storage device at a secondary storage subsystem.

In some configurations, multiple primary storage subsystems send data to a single secondary storage subsystem. The secondary storage subsystem may become overloaded by the amount of data being sent by the primary storage subsystems.

In some systems, the secondary storage subsystem issues an error condition to the primary storage subsystems when a threshold on the secondary storage subsystem was exceeded. The threshold relates to an amount of resource usage. This error condition informs the primary storage subsystems to halt all Input/Output (I/O) to the secondary storage subsystem for a fixed time-out period. In addition, when the threshold is reached, all data currently being transferred is discarded by the secondary storage subsystem and needs to be resent by the primary storage subsystems. Resending the data is wasteful. Also, waiting the time-out period is more wasteful in a high bandwidth environment (e.g., a Fibre channel environment) than in a low bandwidth environment.

The primary storage subsystems receive the error condition and wait for the fixed timeout period before resuming data transfer. Even if the secondary storage subsystem may be ready to process additional data before the fixed timeout period ends, the primary storage subsystems wait the entire fixed period of time, which results in the secondary storage subsystem idling when data transfer and processing could be taking place.

FIG. 1 illustrates, with a graph 100, effects of a prior art solution. The graph 100 depicts time along the horizontal axis and secondary resource usage percentage along the vertical axis. At point 110, a maximum resource usage level is reached at the secondary storage subsystem. The secondary storage subsystem sends a message to all primary storage subsystems to wait the fixed time-out period. At point 120, the secondary storage subsystem has enough resources available to resume processing data, but it is not until point 130 that the primary storage subsystems resume transferring data. Therefore, the time between point 120 and 130 is not being used efficiently.

Additionally, such a solution is not "fair" to all primary storage subsystems connected to the secondary storage subsystem in certain situations. For example, assume that primary storage subsystem A and primary storage subsystem B are connected to one secondary storage subsystem. Primary storage subsystem A is driving resource usage (by transferring data) on the secondary storage subsystem near, but just below, the maximum resource usage level. Primary storage subsystem B begins to drive resource usage on the secondary storage subsystem and pushes the resource usage over the maximum resource usage level. Then, the secondary storage system sends an error condition to both primary storage subsystems A and B. Both primary storage subsystems A and B wait the fixed time-out period. Then, both primary storage subsystems again start driving resource usage Primary storage subsystem B is given an error and needs to wait for the fixed timeout period. Primary storage subsystem A is transferring data at a faster rate and so again drives resource usage at the secondary storage subsystem near, but just below, the maximum resource usage level. Again, primary storage subsystem B, which is transferring data at a slower rate than primary storage subsystem A, pushes the resource usage over the maximum resource usage level. This cycle continues, and primary storage subsystem B is unfairly being allowed to send less data than primary storage subsystem A for a given period of time.

Thus, there is a need in the art for throttling data transfer between systems.

SUMMARY OF THE INVENTION

Provided are a method, system, and program for throttling data transfer. An amount of resources that are in use is determined. When the amount of resources reaches a high threshold, one or more primary control units are notified to temporarily stop sending data. When the amount of resources reaches a low threshold, each previously notified primary control unit is notified to resume sending data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention send an asynchronous message to one or more primary control units when limited resource usage on a secondary control unit is near, but below, a certain final threshold (e.g., a maximum allowed resource usage level).

Figure 1:
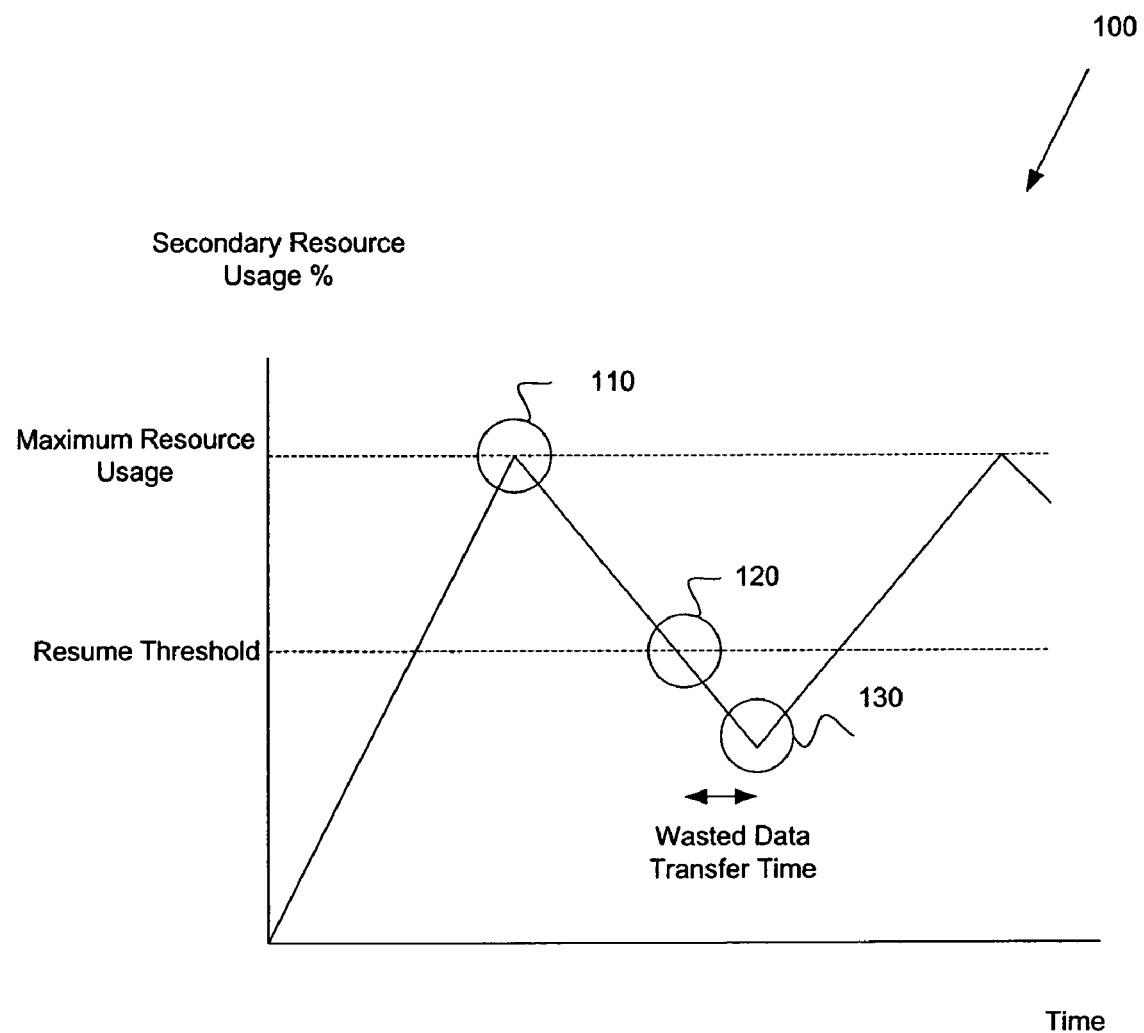
FIG. 1 illustrates, with a graph, effects of a prior art solution.
Figure 2:
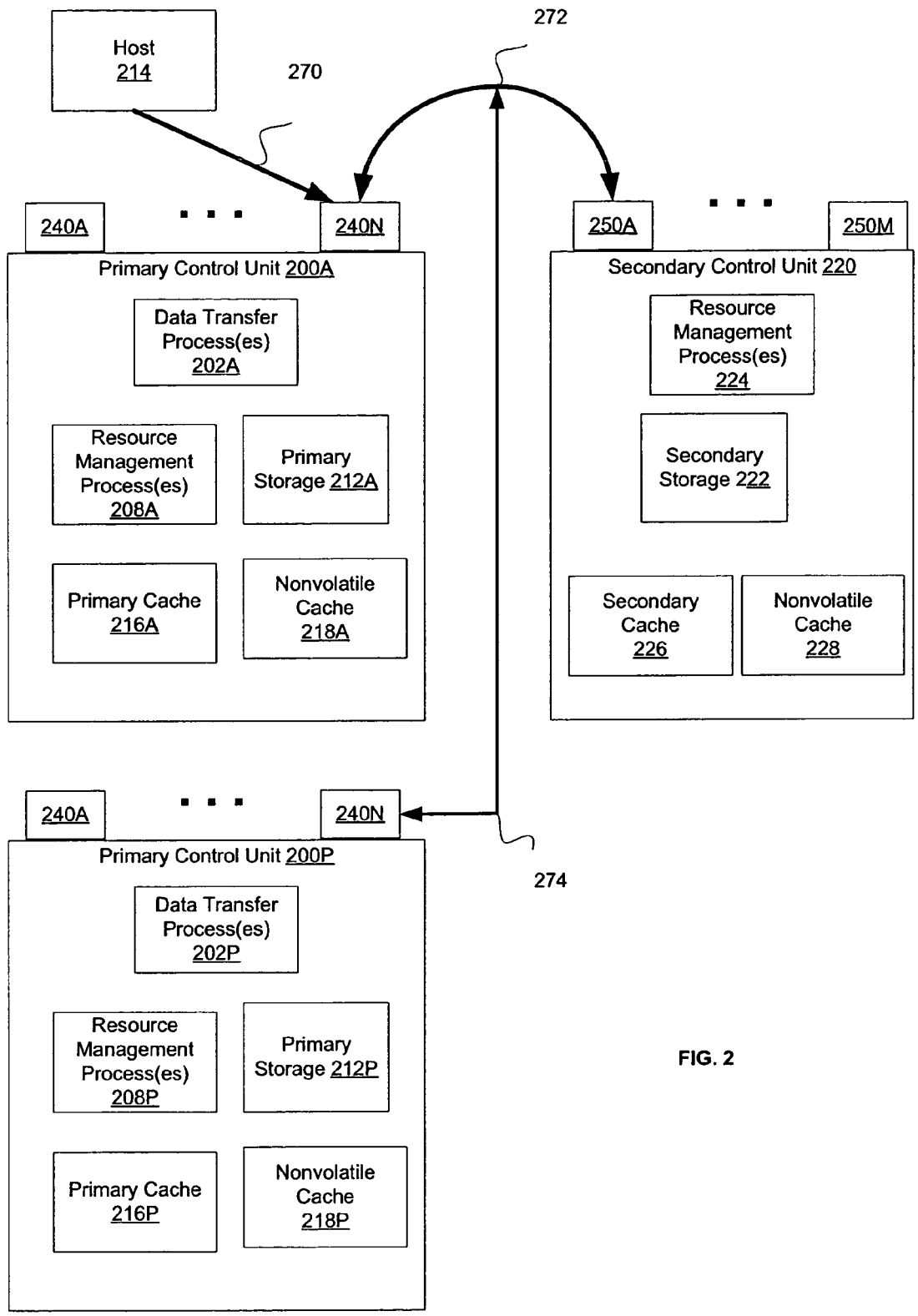
FIG. 2 illustrates, in block diagrams, a computing environment in accordance with certain implementations of the invention.

FIG. 2 illustrates, in block diagrams, a computing environment in accordance with certain implementations of the invention. One or more primary control units 200A . . . 200P are connected to secondary control unit 220. For ease of reference, A . . . P are used to represent multiple components (e.g., 200A . . . 200P). Each primary control unit 200A . . . 200P provides one or more hosts (e.g., host 214) access to primary storage 212A . . . 212P, such as Direct Access Storage Device (DASD). The primary storage 212A . . . 212P may be divided into blocks of storage containing blocks of data, and the blocks of storage are further divided into sub-blocks of storage that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

Each primary control unit 200A . . . 200P includes a primary cache 216A . . . 216P in which updates to blocks of data in the primary storage 212A . . . 212P are maintained until written to primary storage 212A . . . 212P (e.g., tracks are destaged). Primary cache 216A . . . 216P may be any type of storage, and the designation of cache illustrates only certain implementations. Additionally, each primary control unit 200A . . . 200P includes a nonvolatile cache 218A . . . 218P. The non-volatile cache 218A . . . 218P may be, for example, a battery-backed up volatile memory, to maintain a non-volatile copy of data updates.

Each primary control unit 200A . . . 200P may include one or more data transfer processes 202A . . . 202P (e.g., for executing an establish with copy command, a Peer-to-Peer Remote Copy (PPRC) Extended Distance command, an asynchronous PPRC copy command, or a synchronous PPRC copy command). Each of the data transfer processes 202A . . . 202P transfers data from each primary control unit 200A . . . 200P to remote storage, such as storage at the secondary control unit 220. In certain implementations, the data transfer process 202A . . . 202P runs continuously for PPRC Extended Distance and asynchronous PPRC commands, and the data transfer process 202A . . . 202P starts up and completes for a synchronous PPRC command. Asynchronous messages may be sent in any mode of the PPRC services (e.g., synchronous PPRC service, an asynchronous PPRC service, a PPRC Extended Distance service, or an establish with copy service).

International Business Machines Corporation (IBM), the assignee of the subject patent application, provides several remote mirroring systems, including, for example: a synchronous PPRC service, an asynchronous PPRC service, a PPRC Extended Distance service, or an establish with copy service in an Enterprise Storage Server® (ESS) system. For ease of reference, the synchronous Peer-to-Peer Remote Copy (PPRC) service, asynchronous PPRC service, and PPRC Extended Distance service will be described as providing synchronous PPRC, asynchronous PPRC, and PPRC Extended Distance commands.

The synchronous PPRC service provides a technique for recovering data updates that occur between a last, safe backup and a system failure with a synchronous PPRC command. Such data shadowing systems can also provide an additional remote copy for non-recovery purposes, such as local access at a remote site. With the synchronous PPRC service, a primary storage subsystem maintains a copy of predefined datasets on a secondary storage subsystem. The copy may be used for disaster recovery. Changes to data are copied to the secondary storage subsystem as an application updates the data. Thus, the copy may be used whether there are gradual and/or intermittent failures. The copy is maintained by intercepting write instructions to the synchronous PPRC dataset and generating appropriate write instructions from the primary storage system to the secondary storage system. The write instructions may update data, write new data, or write the same data again.

The synchronous PPRC service copies data to the secondary storage subsystem to keep the data synchronous with a primary storage subsystem. That is, an application system writes data to a volume and then transfers the updated data over, for example, Enterprise System Connection (ESCON®) fiber channels to the secondary storage subsystem. The secondary storage subsystem writes the data to a corresponding volume. Only when the data is safely written to volumes at both the primary and secondary storage subsystems does the application system receive assurance that the volume update is complete.

Thus, with synchronous PPRC commands, the copy at the secondary storage subsystem is maintained by intercepting write instructions to the dataset at the primary storage subsystem and generating appropriate write instructions from the primary storage system to the secondary storage system.

For synchronous PPRC, before the host 214 receives an acknowledgment of completion of the write process when writing a chain of tracks to a primary control unit 200A . . . 200P, all tracks in the chain are also transferred to the secondary control unit 220.

Asynchronous PPRC and PPRC Extended Distance commands do not write to secondary storage subsystem before acknowledging the write to the primary storage subsystem. Instead, for the PPRC Extended Distance service, when a block of data is written, information is stored that indicates that the block of data is to be transferred to the secondary storage subsystem at a later time. An asynchronous process collects updates at the primary storage subsystem and sends the updates to the secondary storage subsystem.

For PPRC Extended Distance, the host 214 may complete writing a track to a primary control unit 200A . . . 200P without the track having been sent to the secondary control unit 220. After the track has been written to the primary control unit 200A . . . 200P, the a transfer process 202A . . . 202P will discover that an indicator corresponding to the track is set to indicate that the track is out of sync with a corresponding track at the secondary control unit 220 and will send the track to the secondary control unit 220. That is, the track is sent asynchronously with respect to the track written by the host.

With an establish with copy command, a copy of a volume at the primary storage subsystem is made at the secondary storage subsystem during an initial copy relationship. After this, updates made to the volume at the primary storage subsystem may be copied to the corresponding copy of the volume at the secondary storage subsystem to keep the copies of the volume in sync.

Each primary control unit 200A . . . 200P also includes one or more resource management processes 208A . . . 208P for managing resources.

In certain implementations, the processes 202A . . . 202P and 208A . . . 208P are implemented as firmware. In certain implementations, the processes 202A . . . 202P and 208A . . . 208P are implemented in a combination of firmware and software. In certain implementations, the processes 202A . . . 202P and 208A . . . 208P are implemented as separate software programs for each process 202A . . . 202P and 208. In certain implementations, the processes 202A . . . 202P and 208A . . . 208P may be combined with each other or other software programs.

For ease of reference, A . . . N are used to represent multiple components (e.g., 240A . . . 240N). Channel adaptors 240A . . . 240N allow the primary control units 200A . . . 200P to interface to channels. For ease of reference, A . . . N are used to represent multiple components (e.g., 240A . . . 240N). In certain implementations, channel adaptors 240A . . . 240N may be Fibre channel adaptors. Also, each primary control unit 200A . . . 200P may include a different number of channel adapters.

Secondary control unit 220 allows access to disk storage, such as secondary storage 222, which maintains back-up copies of all or a subset of the volumes of the primary storage 212A . . . 212P. Secondary storage may be a Direct Access Storage Device (DASD). Secondary storage 222 is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The secondary control unit 220 also includes one or more resource management processes 224 for managing resources. In certain implementations each resource management process 224 manages a portion of a single cache. In certain alternative implementations, each resource management process 224 manages a separate cache. In certain implementations, the processes 224 are implemented as firmware. In certain implementations, the processes 224 are implemented in a combination of firmware and software. In certain implementations, the processes 224 are implemented as separate software programs for each process 224. In certain implementations, the processes 224 may be combined with other software programs.

For ease of reference, A . . . M are used to represent multiple components (e.g., 200A . . . 200M). Channel adaptors 250A . . . 250M allow the secondary control unit 220 to interface to channels. For ease of reference, A . . . M are used to represent multiple components (e.g., 250A . . . 250M). In certain implementations, channel adaptors 250A . . . 250M may be Fibre channel adaptors.

Although for ease of illustration, only communication paths 270, 272 and 274 are illustrated, there may be communication paths between host 214 and each channel adapter 240A . . . 240N and between channel adapters 240A . . . 240N and channel adapters 250A . . . 250M.

In certain implementations, communication path 272 between channel adapter 240N and 250A is bidirectional. Also, any control unit 200A . . . 200P or 220 may be designated a primary control unit, and any other control unit 200A . . . 200P or 220 may be designated as a secondary control unit for certain commands. For example, control unit 200A may be designated as a primary control unit 220 for an asynchronous PPRC command, while control unit 220 may be designated as a primary control unit 220 for an establish with copy command (e.g., to make an initial copy of a volume).

Thus, a channel adaptor 240A . . . 240N may receive I/O requests from communication path 270 or communication path 272. In certain implementations, the I/O requests may include, for example, host I/O commands, asynchronous PPRC commands, Extended Distance PPRC commands, synchronous PPRC commands, and establish with copy commands.

In certain implementations, each primary control unit 200A . . . 200P communicates with the secondary control unit 220 via communication paths, such as direct high speed transmission lines (e.g., an Enterprise System Connection (ESCON®) link). However, the communication paths may be comprised of any other communication means known in the art, including network transmission lines, fiber optic cables, etc., as long as the primary control unit 100 and secondary control unit 120 are able to communicate with each other.

In certain implementations, each primary control unit 200A . . . 200P and secondary control unit 220 may be comprised of the IBM® 3990, Model 6 Storage Controller, Enterprise Storage Server®, or any other control unit known in the art, as long as the primary control unit 100 and secondary control unit 120 are able to communicate with each other.

In certain implementations, each primary control unit 200A . . . 200P and/or secondary control unit 220 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, and secondary storage.

In certain implementations of the invention, data is maintained in volume pairs. A volume pair is comprised of a volume in a primary storage device (e.g., primary storage 212A . . . 212P) and a corresponding volume in a secondary storage device (e.g., secondary storage 222) that includes a consistent copy of the data maintained in the primary volume. For example, primary storage 212A . . . 212P may include VolumeA and VolumeB, and secondary storage 222 may contain corresponding VolumeX and VolumeY, respectively.

In certain implementations, removable and/or non-removable storage (instead of or in addition to remote storage, such as secondary storage 222) with a cache may be used to maintain back-up copies of all or a subset of the primary storage 212A . . . 212P, and the techniques of the invention transfer data to the removable and/or non-removable storage rather than to the remote storage. The removable and/or non-removable storage may reside at a primary control unit 200A . . . 200P.

Figure 3A:
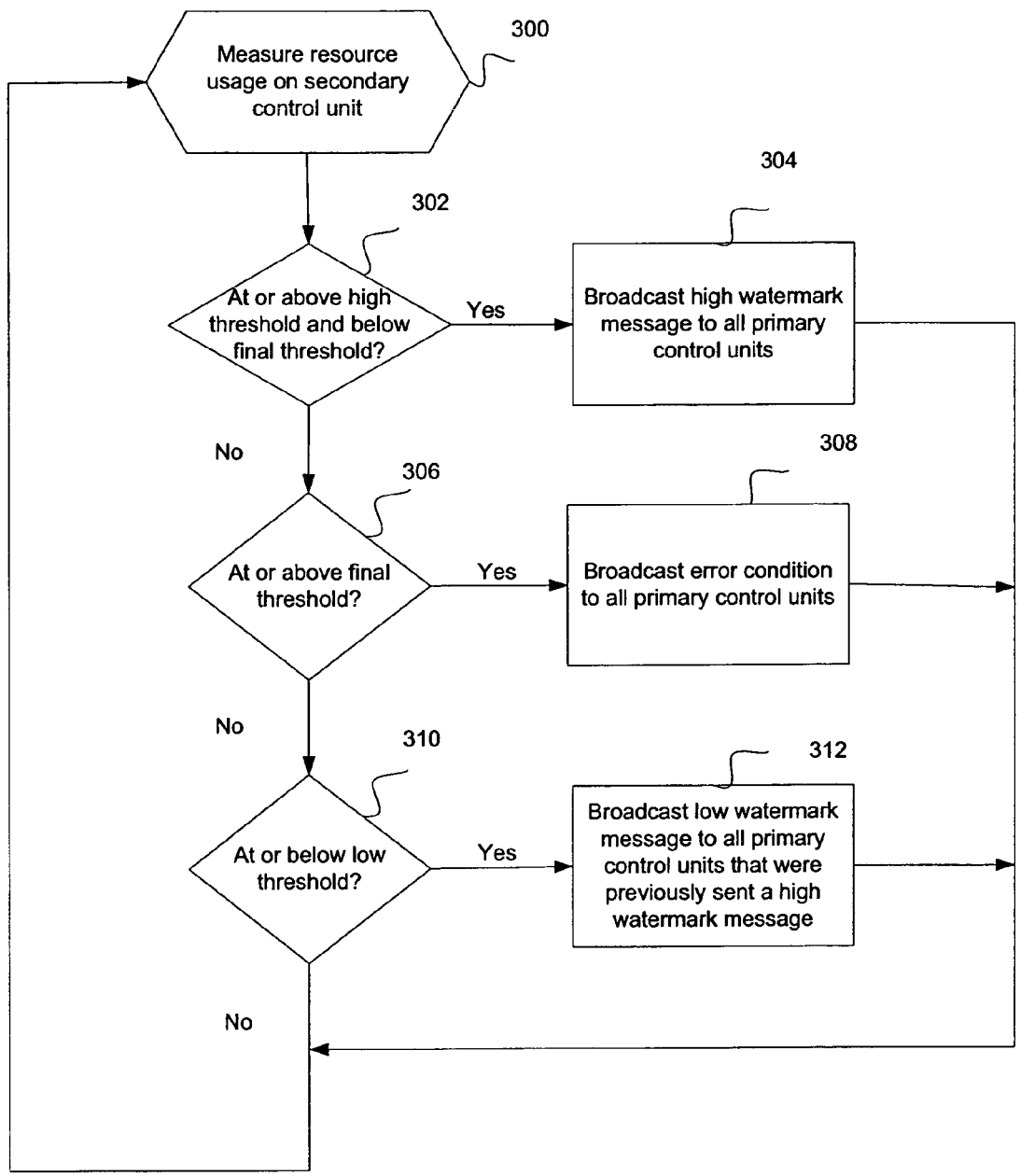
FIG. 3A illustrates logic performed by a resource management process to throttle data transfer in accordance with certain implementations of the invention.

FIG. 3A illustrates logic performed by a resource management process 224 to throttle data transfer in accordance with certain implementations of the invention. Control begins at block 300 with at least one resource management process 224 measuring resource usage at the secondary control unit 220. In certain implementations, each resource management process 224 measures a percentage of secondary cache 226 use (i.e., a percentage of how much of the secondary cache 226 is already storing data from the primary control units 200A . . . 200P for processing by the secondary control unit 220). In certain implementations, each resource management process 224 measures a percentage of the secondary cache 226 that has been allocated for Sequential Fast Write (SFW) operations. The SFW operations are of the type that are performed when establishing a relationship (e.g., a PPRC relationship) in which the data from a primary control unit 200A . . . 200P is sequentially transferred to a secondary control unit 226. Thus, with certain implementations, messages halting data transfer on the primary control units 200A . . . 200P may be sent while bandwidth is still available on the connection path (e.g., Fibre channel connection). Implementations of the invention are especially useful in situations in which the communication path can transfer more data in a given amount of time than the secondary control unit 220 is capable of processing.

In block 302, each resource management process 224 determines whether the resource usage is at/or above a high threshold (also referred to as a "high watermark") and below a final threshold In certain implementations, the high watermark and final threshold each represent a percentage of cache usage. In cases in which a portion of a resource is reserved (e.g., for operations or uses other than to store transferred data to be processed), the final threshold may be less than a 100 percent. If resource usage is at or above the high threshold, processing continues to block 304, otherwise, processing continues to block 306. In block 304, each resource management process 224 broadcasts (i.e., notifies) a high watermark message to all primary control units and then processing loops back to block 300. In certain implementations, the high watermark message is an asynchronous message, which is not an error message, but a message indicating that the primary control units 200A . . . 200P should halt data transfer temporarily. The primary control units 200A . . . 200P halt data transfer either for a predetermined time period or until the secondary control unit 220 sends a low watermark message (e.g., asynchronously) indicating that the secondary control unit 220 is ready to resume processing data (e.g., ready to resume full speed operation). In the event that the low watermark message is lost, the primary control units 200A . . . 200P resume processing after waiting the predetermined period of time.

In block 306, each resource management process 224 determines whether the resource usage is at or above the final threshold. If resource usage is at or above the final threshold, processing continues to block 308, otherwise, processing continues to block 310. In block 308, each resource management process 224 broadcasts an error condition to all primary control units 200A . . . 200P and then processing loops back to block 300. This error condition informs the primary control units 200A . . . 200P to halt I/O to the secondary control unit 220 for a predetermined time period.

In block 310, each resource management process 224 determines whether the resource usage is at or below a low threshold (also referred to as a "low watermark"). In certain implementations, the low watermark represents a percentage of cache usage. If resource usage is at or below the low threshold, processing continues to block 312, otherwise, processing loops back to block 300. In block 312, each resource management process 224 broadcasts a low watermark message to all primary control units 200A . . . 200P that were previously sent a high watermark message. For example, because it is possible for new primary control units to become active or come online after the high watermark message has been sent, the new primary control units would not be sent the low watermark message. In certain alternative implementations, the high watermark message is sent to all primary control units 200A . . . 200P.

Figure 3B:
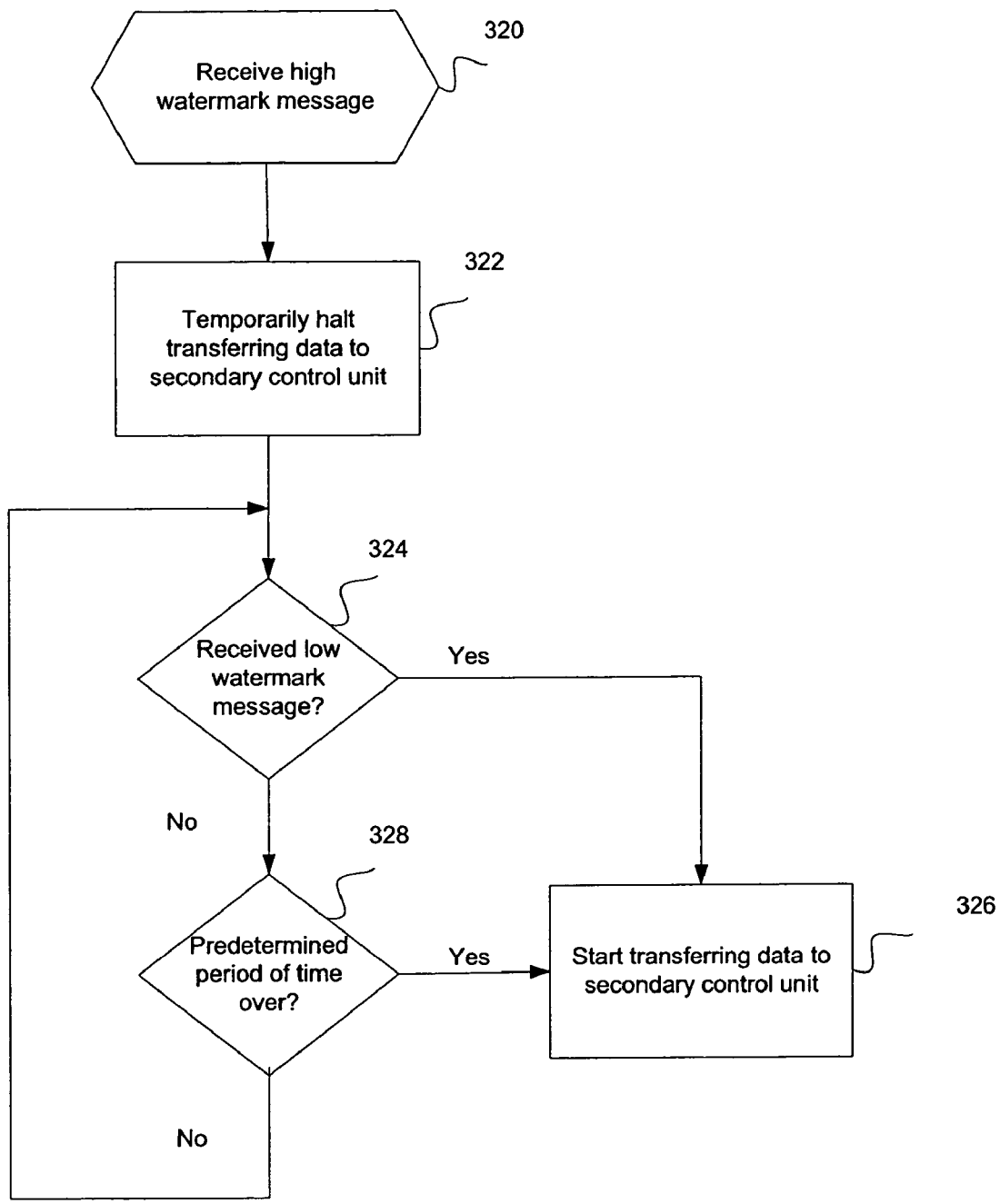
FIG. 3B illustrates logic performed by a data transfer process in accordance with certain implementations of the invention.

FIG. 3B illustrates logic performed by a data transfer process 202A . . . 202P in accordance with certain implementations of the invention. Control begins at block 320 with at least one data transfer process 202A . . . 202P at a primary control unit 200A . . . 200P receiving a high watermark message. In block 322, the data transfer process 202A . . . 202P temporarily halts transferring data to the secondary control unit 220. In block 324, the data transfer process 202A . . . 202P determines whether a low watermark message was received. If so, processing continues to block 326, otherwise, processing continues to block 328. In block 328, the data transfer process 202A . . . 202P determines whether a predetermined period of time is over. If so, processing continues to block 326, otherwise, processing loops back to block 320. In block 326, the data transfer process 202A . . . 202P starts transferring data to the secondary control unit 220.

Figure 4:
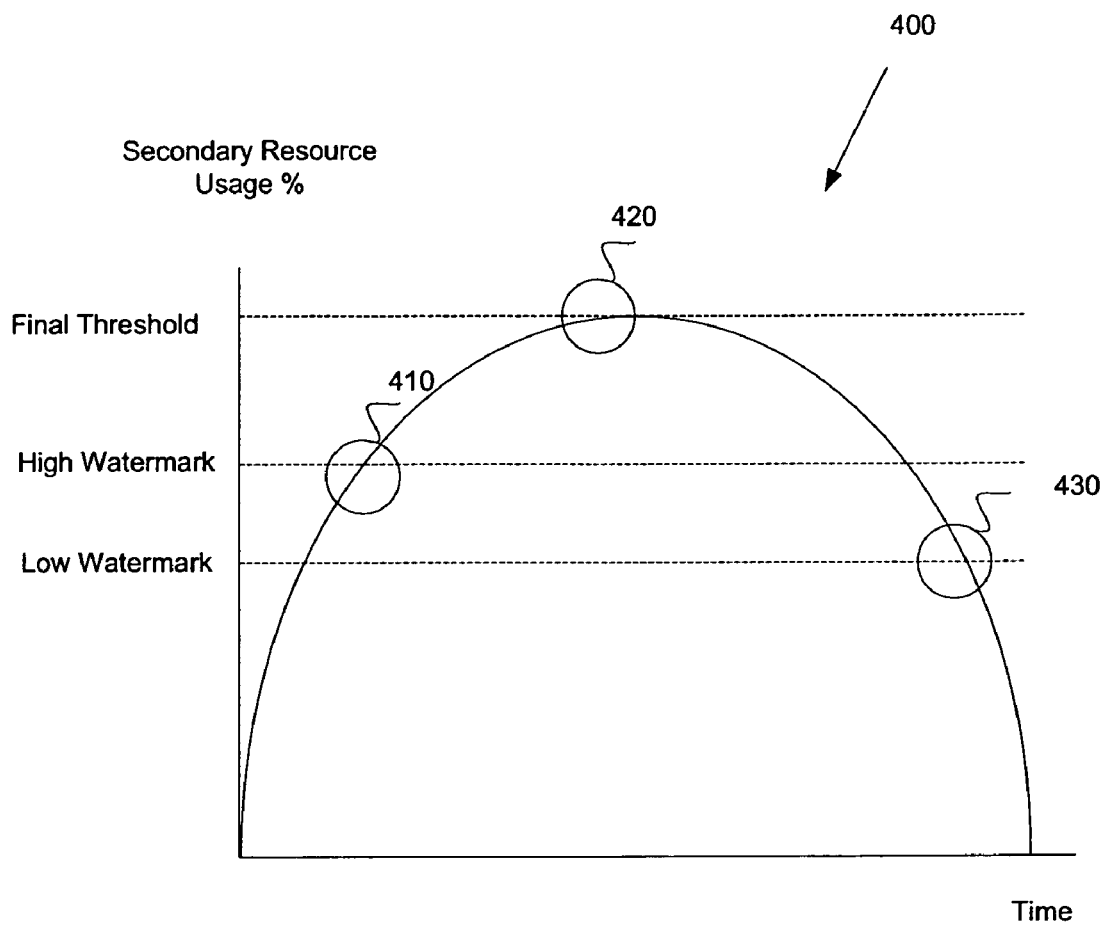
FIG. 4 illustrates, with a graph, effects of certain implementations of the invention.

FIG. 4 illustrates, with a graph 400, effects of certain implementations of the invention. The graph 400 depicts time along the horizontal axis and secondary resource usage percentage along the vertical axis. At point 410, at least one resource management process 224 at the secondary control unit 220 broadcasts a high watermark message to all primary control units 200A . . . 200P. At point 420, at least one resource management process 224 broadcasts a high watermark message to all primary control units 200K . . . 200P. At point 430, the least one resource management process 224 broadcasts a low watermark message to all primary control units 200A . . . 200F that were scat a high watermark message. For example, the final threshold may be 10 percent, while the high watermark may be 8 percent and the low watermark may be 6 percent.

Figure 5:
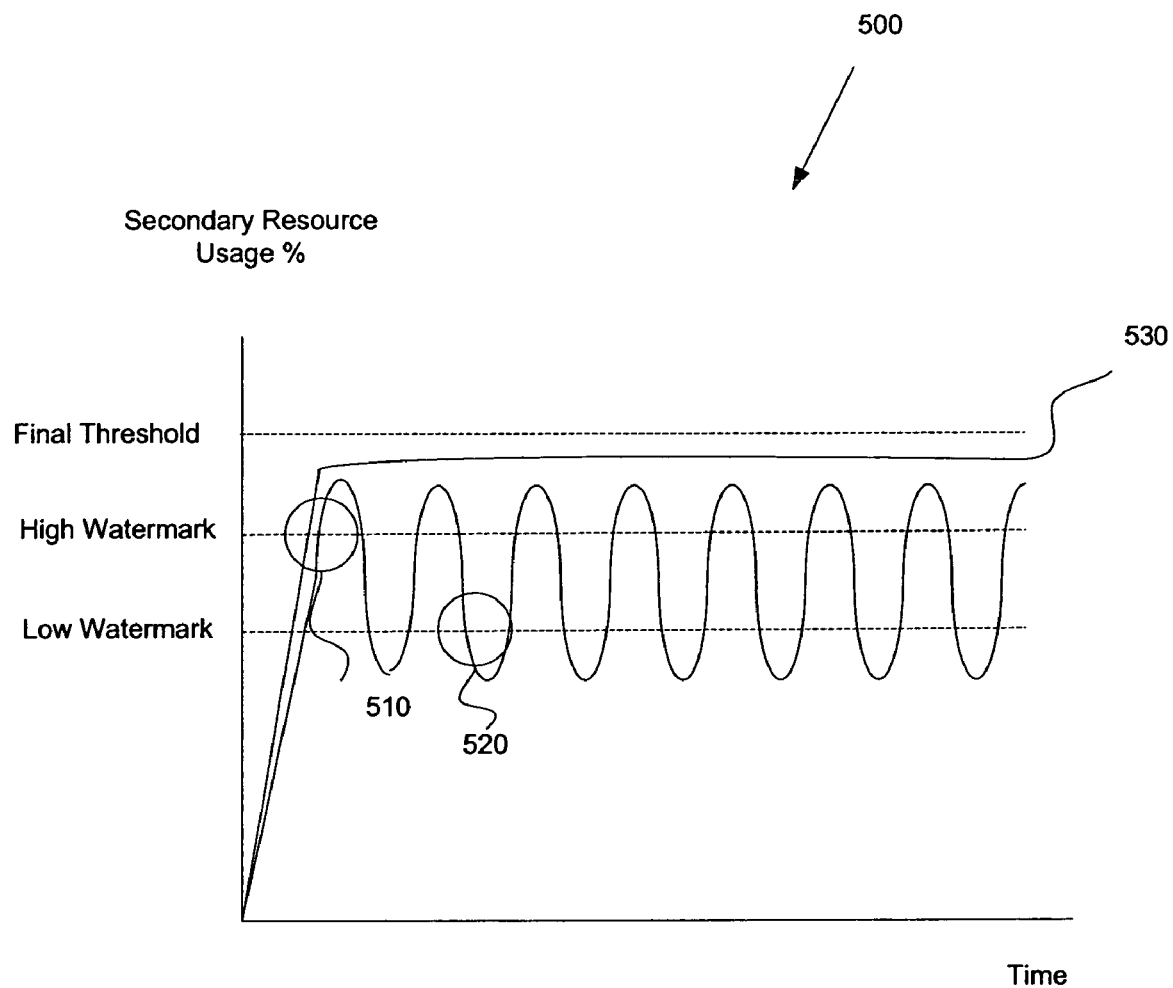
FIG. 5 illustrates, with a graph, effects of certain implementations of the invention.

FIG. 5 illustrates, with a graph 500, effects of certain implementations of the invention. The graph 500 depicts time along the horizontal axis and secondary resource usage percentage along the vertical axis. At point 510, the high watermark message is broadcast,. and at point 520, the low watermark message is broadcast line 530 represents an "ideal" ease, and percentages for the high and low watermarks may be tuned to get close to the "ideal" case.

Figure 6:
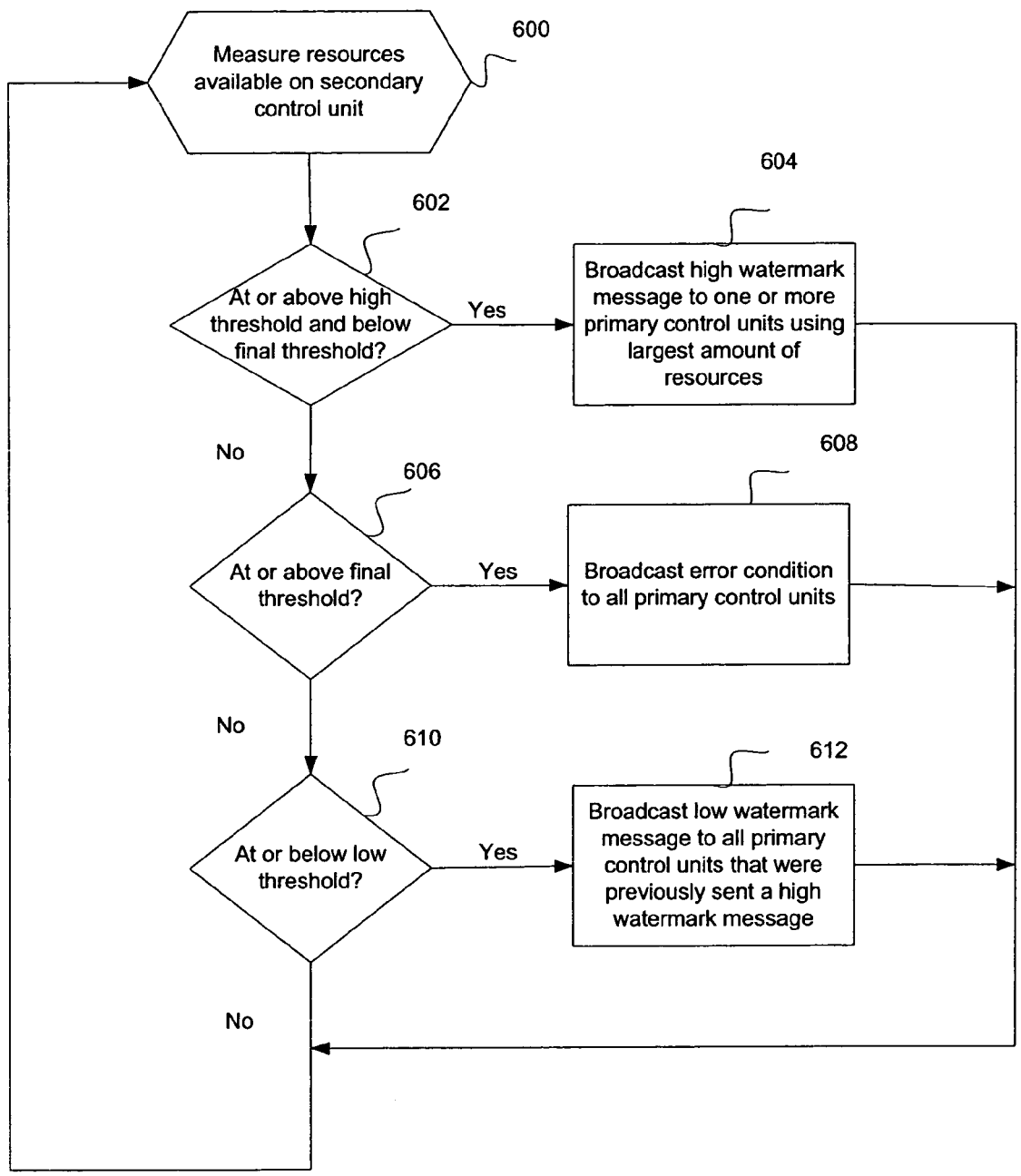
FIG. 6 illustrates logic performed by a resource management process to throttle data transfer in accordance with certain alternative implementations of the invention.

FIG. 6 illustrates logic performed by a resource management process to throttle data transfer in accordance with certain alternative implementations of the invention. In these alternative implementations, each resource management process 224 maintains information on what percentage of secondary cache 226 each primary control unit 200A . . . 200P is using. Control begins at block 600 with at least one resource management process 224 measuring resource usage at the secondary control unit 220. In certain implementations, each resource management process 224 measures a percentage of secondary cache 226 use (i.e., a percentage of how much of the secondary cache 226 is already storing data from the primary control units 200A . . . 200P for processing by the secondary control unit 220). In certain implementations, each resource management process 224 measures a percentage of the secondary cache 226 that has been allocated for Sequential Fast Write (SFW) operations. The SFW operations are of the type that are performed when establishing a relationship (e.g., a PPRC relationship) in which the data from a primary control unit 200A . . . 200P is sequentially transferred to a secondary control unit 226.

In block 602, each resource management process 224 determines whether the resource usage is at or above a high threshold (also referred to as a "high watermark") and below a final threshold. If resource usage is at or above the high threshold, processing continues to block 604, otherwise, processing continues to block 606. In block 604, each resource management process 224 broadcasts a high watermark message to one or more primary control units that are using the largest amount of resources and that have not already received high watermark messages without subsequent low watermark messages and then processing loops back to block 600. For example, if primary control units A, B, and C are each using 2 percent of cache, while all other primary control units are each using 1 percent of cache, then primary control units A and B may be sent high watermark messages. Then, the next time the resource management process 224 is selecting one or more primary control units to receive a high watermark message, primary control unit C may be selected.

In certain implementations, the high watermark message is an asynchronous message, which is not an error message, but a message indicating that the primary control units 200A . . . 200P should halt data transfer temporarily. The primary control units 200A . . . 200P halt data transfer either for a predetermined time period or until the secondary control unit 220 sends a low watermark message (e.g., asynchronously) indicating that the secondary control unit 220 is ready to resume processing data (e.g., ready to resume full speed operation). In the event that the low watermark message is lost, the primary control units 200A . . . 200P resume processing after waiting the predetermined period of time.

In block 606, each resource management process 224 determines whether the resource usage is at or above the final threshold. If resource usage is at or above the final threshold, processing continues to block 608, otherwise, processing continues to block 610. In block 608, each resource management process 224 broadcasts an error condition to all primary control units 200A . . . 200P and then processing loops back to block 600.

In block 610, each resource management process 224 determines whether the resource usage is at or below the low threshold. If resource usage is at or below the low threshold, processing continues to block 612, otherwise, processing loops back to block 600. In block 612, each resource management process 224 broadcasts a low watermark message to all primary control units 200A . . . 200P that were previously sent a high watermark message. In certain alternative implementations, the high watermark message is sent to all primary control units 200A . . . 200P. This error condition informs the primary control units 200A . . . 200P to halt I/O to the secondary control unit 220 for a predetermined time period. Thus, the primary control units 200A . . . 200P that are driving large amounts of I/O would not interfere with the transfer of data by relatively slow primary control units 200A . . . 200P.

Thus, certain implementations of the invention send asynchronous messages to throttle data transfer between two or more systems, while maintaining "fairness" to all primary storage control units. Implementations of the invention reduce response time to resume data transfer when a secondary control unit is driven to a maximum data transfer capability.

IBM, Enterprise Storage Server, and ESCON are registered trademarks or common law marks of International Business Machines Corporation in the United States and/or foreign countries.

Additional Implementation Details

The described techniques for throttling data transfer may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 3A, 3B, and 6 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3A, 3B, and 6 may be implemented in software, hardware, programmable and non-programmable gate array logic or in some combination of hardware, software, or gate array logic.

Figure 7:
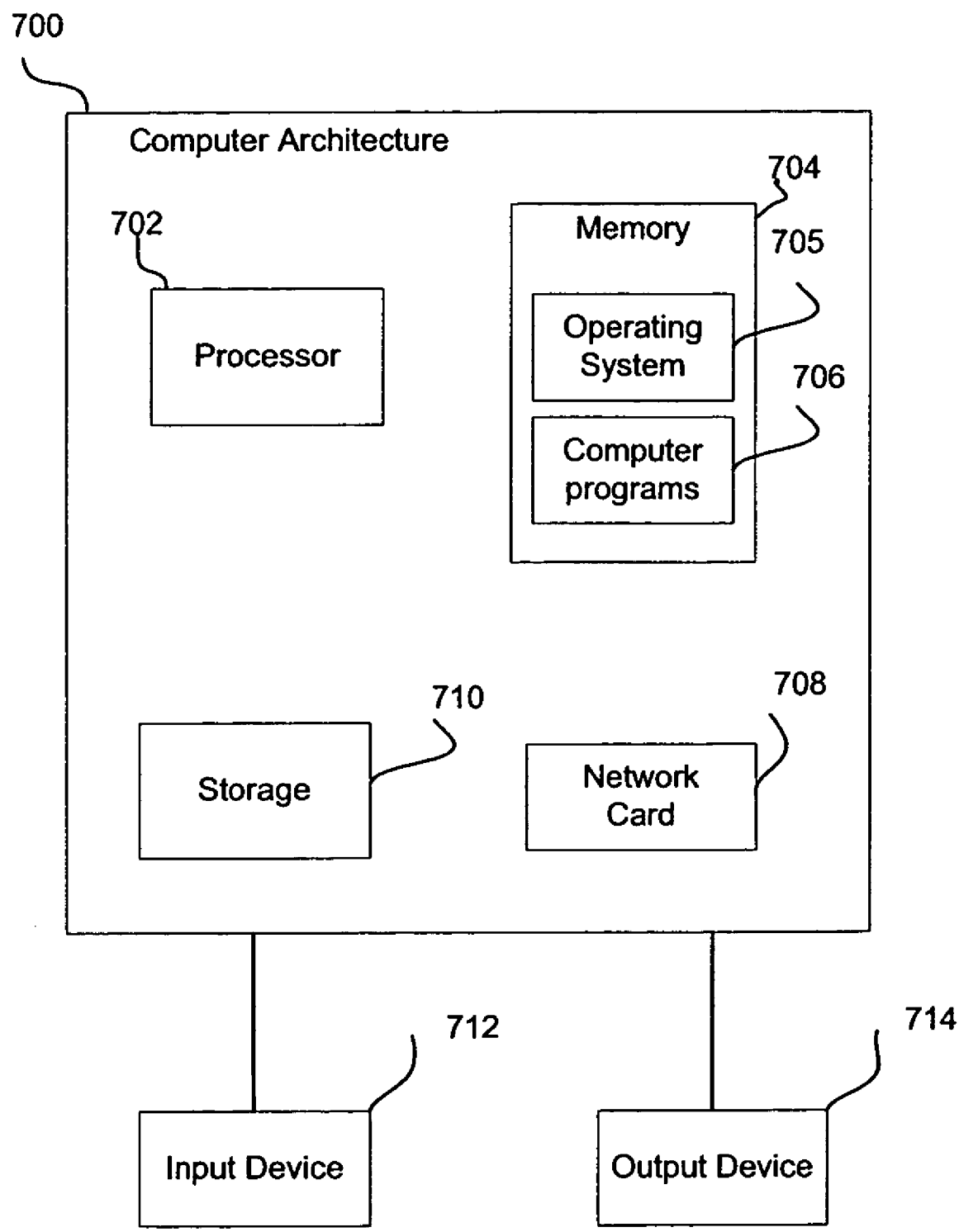
FIG. 7 illustrates one implementation of the architecture of computer systems in accordance with certain implementations of the invention.

FIG. 7 illustrates an architecture 700 of a computer system that may be used in accordance with certain implementations of the invention. Host 214, any primary control unit 200A . . . 200P, and/or secondary control unit 220 may implement computer architecture 700. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for throttling data transfer, comprising:
   determining an amount of resources that are in use;
   when the amount of resources reaches a high threshold, notifying one or more primary control units to temporarily stop sending data by sending a message,
   wherein the one or more primary control units that are notified to temporarily stop sending data are selected from ones that are using a largest amount of resources and that have received a message to resume sending data after receiving a message to temporarily stop sending data, and ones that are using the largest amount of resources and that have not already received a message to temporarily stop sending data; and
   when the amount of resources reaches a low threshold, notifying each previously notified primary control unit to resume sending data by sending a message.

2. The method of claim 1, further comprising:
   at a primary control unit, resuming sending data after a predetermined period of time has expired without receipt of notification to resume sending data.

3. The method of claim 1, further comprising: when the amount of resources used is above a final threshold, re-notifying the one or more primary control units to temporarily stop sending data.

4. The method of claim 1, wherein at least one of the resources is a cache.

5. The method of claim 1, wherein the amount is measured by a percentage.

6. The method of claim 1, further comprising:
   maintaining information on the amount of resources being used by each primary control unit.

7. An article of manufacture including a program for throttling data transfer, wherein the program causes operations to be performed, the operations comprising:
   determining an amount of resources that are in use;
     when the amount of resources reaches a high threshold, notifying one or more primary control units to temporarily stop sending data by sending a message,
     wherein the one or more primary control units that are notified to temporarily stop sending data are selected from ones that are using a largest amount of resources and that have received a message to resume sending data after receiving a message to temporarily stop sending data, and ones that are using the largest amount of resources and that have not already received a message to temporarily stop sending data; and
   when the amount of resources reaches a low threshold, notifying each previously notified primary control unit to resume sending data by sending a message.

8. The article of manufacture of claim 7, wherein the operations further comprise:
   at a primary control unit, resuming sending data after a predetermined period of time has expired without receipt of notification to resume sending data.

9. The article of manufacture of claim 7, wherein the operations further comprise:
   when the amount of resources used is above a final threshold, re-notifying the one or more primary control units to temporarily stop sending data.

10. The article of manufacture of claim 7, wherein at least one of the resources is a cache.

11. The article of manufacture of claim 7, wherein the amount is measured by a percentage.

12. The article of manufacture of claim 7, wherein the operations further comprise:
    maintaining information on the amount of resources being used by each primary control unit.

13. A system for throttling data transfer, comprising:
    means for determining an amount of resources that are in use;
    means for when the amount of resources reaches a high threshold, notifying one or more primary control units to temporarily stop sending data by sending a message,
    wherein the one or more primary control units that are notified to temporarily stop sending data are selected from ones that are using a largest amount of resources and that have received a message to resume sending data after receiving a message to temporarily stop sending data, and ones that are using the largest amount of resources and that have not already received a message to temporarily stop sending data; and
    means for when the amount of resources reaches a low threshold, notifying each previously notified primary control unit to resume sending data by sending a message.

14. The system of claim 13, further comprising:
    at a primary control unit, means for resuming sending data after a predetermined period of time has expired without receipt of notification to resume sending data.

15. The system of claim 13, further comprising:
    when the amount of resources used is above a final threshold, means for re-notifying the one or more primary control units to temporarily stop sending data.

16. The system of claim 13, wherein at least one of the resources is a cache.

17. The system of claim 13, wherein the amount is measured by a percentage.

18. The system of claim 13, further comprising:
    means for maintaining information on the amount of resources being used by each primary control unit.

* * * * *